Patented Apr. 28, 1925.

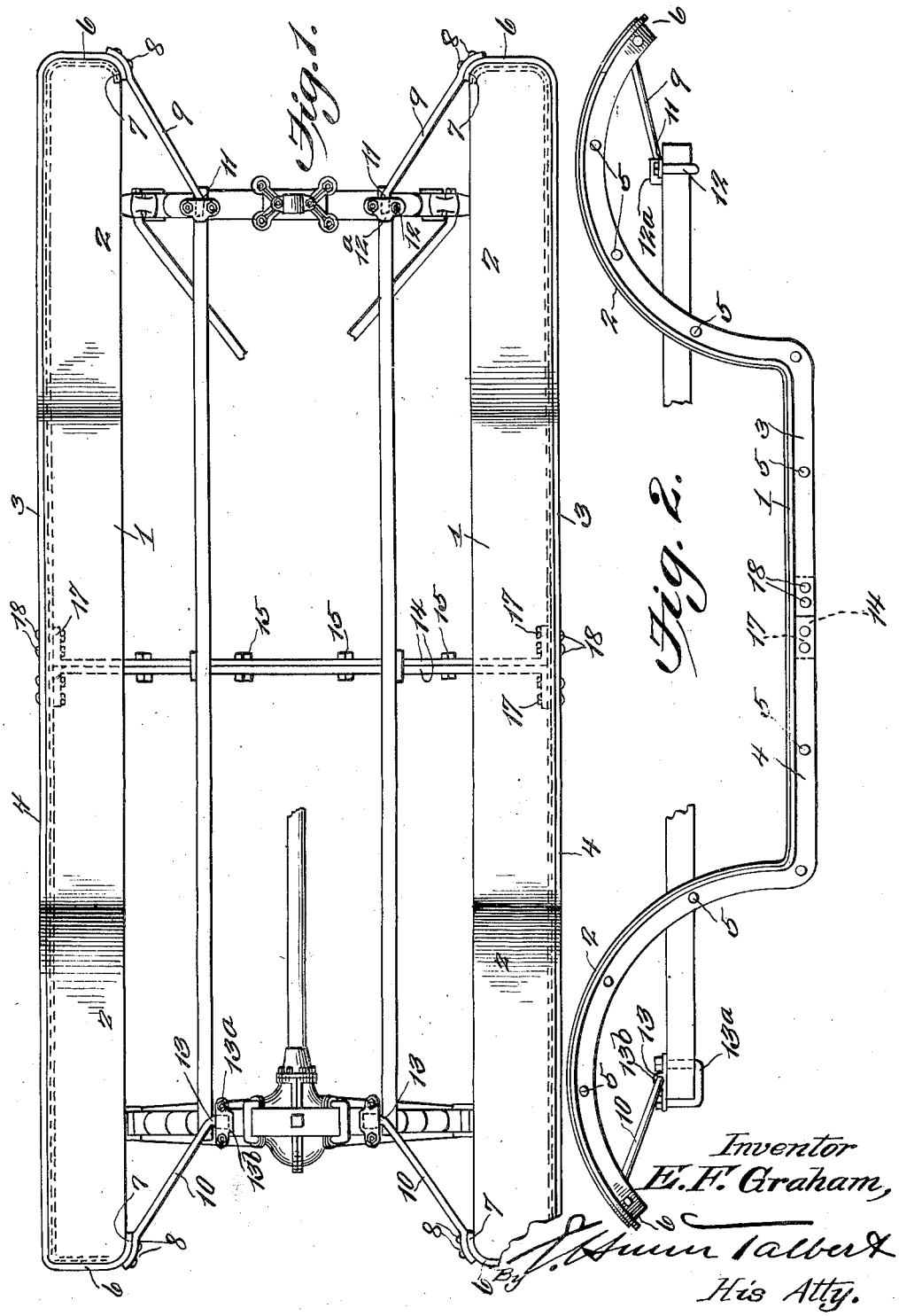

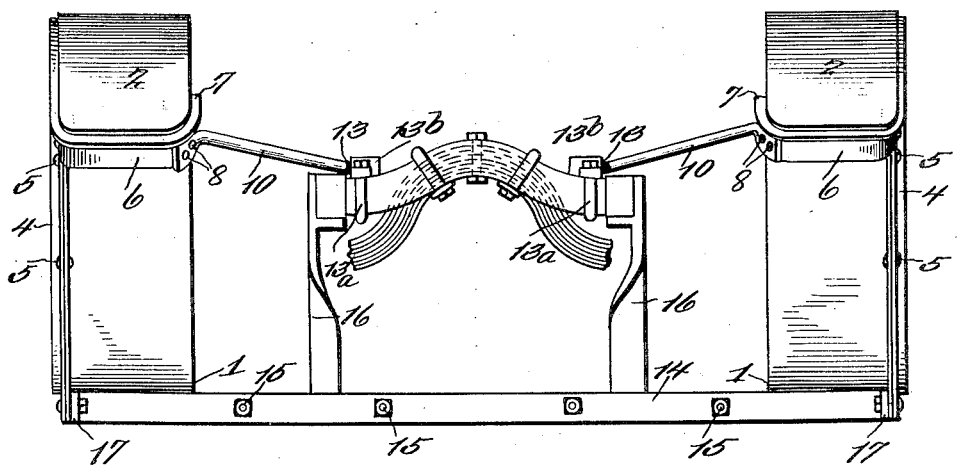
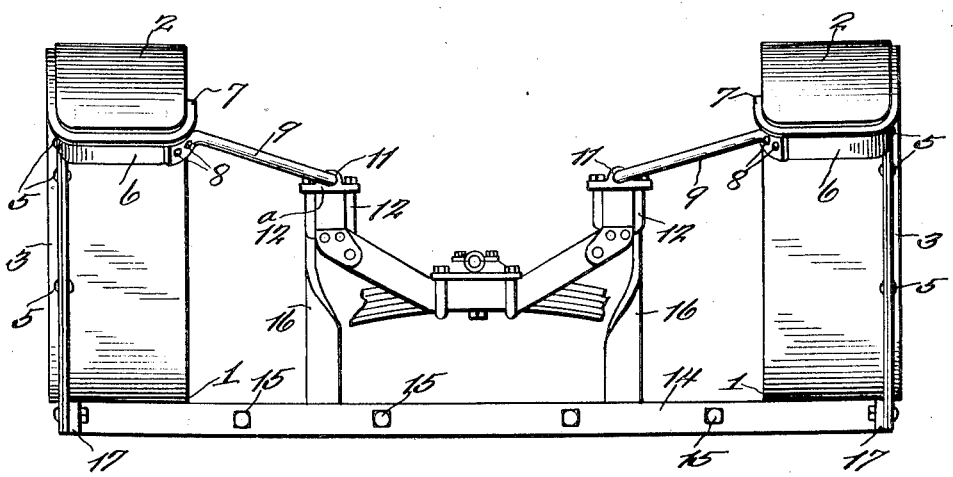
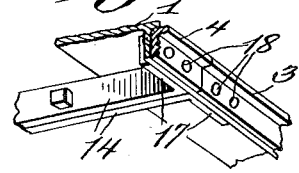

1,535,826

UNITED STATES PATENT OFFICE.

ELLIS FAYTTE GRAHAM, OF LOUISVILLE, KENTUCKY.

FENDER-PROTECTING BRACE.

Application filed April 15, 1924. Serial No. 706,764.

*To all whom it may concern:*

Be it known that ELLIS FAYTTE GRAHAM, a citizen of the United States of America, residing at Louisville, in the county of Jefferson and State of Kentucky, has invented new and useful Improvements in Fender-Protecting Braces, of which the following is a specification.

Fender braces, wherein the connections are made from one fender to the other at the front and rear of an automobile, have been devised. Also braces have been employed for reinforcing the running-board which merge into the wheel fenders, but these devices have been found impractical due to the fact that there are no reinforcements between the running-board and the wheel fenders themselves, hence the present invention has for its purpose to provide, in a fender protecting brace, a construction for reinforcing the running-board relative to the wheel fenders and at the same time acting as protecting means for the edges of the wheel fenders and the running-board.

Another purpose is to provide means for reinforcibly connecting the opposite running-boards, in conjunction with margin or edge protecting braces carried by and conforming to the contour of the running-board and the wheel fenders to retain such parts in shape and prevent sagging, the end portions of the protecting brace being secured to the remote ends of the forward and rear wheel fenders, in connection with bracing supports connecting the extremities of the protecting braces with the forward and rear parts of the automobile chassis, thereby insuring rigidity of the fenders and running-board relative to the chassis.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a plan view of the opposite wheel fenders and running-boards of the automobile chassis, showing the protecting fender and running-board braces applied in accordance with the invention.

Figure 2 is a view in side elevation.

Figure 3 is a rear view.

Figure 4 is a front view.

Figure 5 is a detail perspective view of a portion of one of the running-boards, showing the braces therefor and showing the transverse reinforcements 14.

Referring to the drawings, 1 designates the opposite running-boards which merge into the forward and rear wheel fenders 2 which are concentric with the forward and rear wheels. Running-board and fender protecting braces 3 and 4 are provided. The braces 3 are disposed to conform to the forward portion of the running-board and the forward wheel fenders, while the braces 4 conform to the rear portions of the running board and the rear wheel fenders.

The braces 3 and 4 are constructed of angle iron, although it is obvious that they may be constructed of strap iron or any other suitable material. However, the braces are disposed to conform with and are secured to the edge portions of the running-boards and the forward and rear wheel fenders, there being suitable rivets or the like 5 to secure such braces in position.

It will be noted that the forward and rear protecting braces 3 and 4 are separately constructed but, when applied, they act as a continuous brace. The purpose of constructing the braces separately is to permit each of them to be easily removed without interference with the other. Obviously, the forward braces may be replaced, if injured, with new ones, it also being possible to replace the rear braces.

The remote end portions of the forward and rear braces 3 and 4 terminate in right angled parts 6 which conform to the remote end edges of the forward and rear wheel fenders. The end parts 6 are secured by any suitable means, preferably rivets, to the end edges of the forward and rear wheel fenders. The extremities 7 of the end parts 6 are arcuate in form so as to conform to the rounded inner corners of the ends of the forward and rear wheel fenders, and riveted or otherwise secured at 8 to the arcuate extremities 7 are forward and rear brace rods 9 and 10.

It will be noted that the brace rods 9 converge rearwardly and inwardly toward the chassis of the automobile and terminate in extensions 11 which are secured to the forward portion of the chassis by U-shaped clamps or bolts or the like 12. These clamps or bolts straddle the extensions 11 and the chassis to retain the extensions in position and thereby permit the brace rods 9 to reinforce the forward portions of the front wheel fenders relative to the frame of the automobile.

The rear braces 10 converge inwardly and forwardly and terminate in extensions 13 which are also secured by U-shaped clamps or bolts to the rear part of the chassis or frame. In this way, the remote portions of the forward and rear wheel fenders are reinforced relative to the chassis to insure rigidity and to withstand rough usage.

To additionally reinforce the wheel fenders and at the same time primarily reinforce the opposite running-boards, transverse braces 14 are provided. These braces are riveted or otherwise secured together, as at 15, and are, in turn, secured to the central portions of the sides of the chassis, as at 16. The opposite ends of the braces 14 terminate in right angled extremities 17 which are bolted, riveted or otherwise secured at 18 to the adjacent ends of the forward and rear braces 3 and 4, thereby in this way reinforcing the opposite running-boards and incidentally reinforcing the forward and rear wheel fenders.

The braces 14 are disposed immediately below the running-boards in order to further insure rigidity. Heretofore the opposite running-boards of an automobile distort centrally downwardly due to constant weight being applied to the running-boards on entering and leaving the automobile. However, with the present invention where the running-boards are reinforced by the braces 14, this constant pressure is greatly offset, thereby rendering the running-boards more durable.

The invention having been set forth, what is claimed is:

In combination with an automobile chassis having running boards at its opposite sides and wheel fenders at the ends of the running boards, a brace structure comprising sections extended around the ends of the wheel fenders and along the outer edges of the fenders and the running boards, bracing bars disposed transversely of the intermediate portion of the chassis and connected with each other and disposed in parallel relation, said bars having angularly disposed end portions extending in opposite directions and secured to the intermediate portions of the said sections at points below the intermediate portions of the running boards, and brace rods connected at their outer ends with the end portions of the sections which are disposed around the ends of the fenders, said brace rods being provided at their inner ends with angularly disposed extremities and clamp devices connecting said extremities with the chassis at the ends thereof.

In testimony whereof he affixes his signature.

ELLIS FAYTTE GRAHAM.